United States Patent [19]
Goldenberg

[11] Patent Number: 6,036,344
[45] Date of Patent: Mar. 14, 2000

[54] SECURE CHECK PROCESSING SYSTEM AND METHOD

[76] Inventor: David Milton Goldenberg, 330 Pleasant Valley Rd., Mendham, N.J. 07945

[21] Appl. No.: 09/095,099

[22] Filed: Jun. 10, 1998

[51] Int. Cl.[7] ...................................................... G06F 17/60
[52] U.S. Cl. ........................................... 364/408; 235/379
[58] Field of Search .............................. 364/408; 235/379

[56] References Cited

U.S. PATENT DOCUMENTS

| | | |
|---|---|---|
| 4,109,238 | 8/1978 | Creekmore . |
| 4,114,027 | 9/1978 | Slater et al. ............................ 364/408 |
| 4,747,050 | 5/1988 | Brachtl et al. .......................... 364/408 |

*Primary Examiner*—Harold I. Pitts
*Attorney, Agent, or Firm*—Foley & Lardner

[57] ABSTRACT

An apparatus and a method for countering fraudulent check cashing schemes includes a central processing center that is connected to a plurality of banks through secure communication channels. Each check drawn against the banks has information stored therein, with that information corresponding to a plurality of digits/characters for the central processing center, a plurality of digits/characters for the bank for which the check is to be drawn against, and an account at the bank for which the check is to be drawn against. The central processing center only stores the digits/characters, and does not know any personal information regarding who/what actually owns the accounts. When a check is presented at a bank, the information on the check is sent through one of the secure communication channels to the central processing system, which determines whether or not the account has sufficient funds to allow the check to be drawn against the account. If the check can be drawn against the account, the central processing system provisionally debits the account, so that all future requests to draw against the account will be checked against the current balance of the account, even though the check has not cleared through the banking system as yet.

12 Claims, 1 Drawing Sheet

SECURE CHECK PROCESSING SYSTEM AND METHOD

BACKGROUND OF THE INVENTION

1. Field of the Invention

The present invention relates to a secure check processing system and method for lessening the possibility of check fraud committed against banks. In particular, the present invention relates to a secure check processing system and method that utilizes a central processing or transaction center.

2. Description of the Related Art

Fraudulent banking transactions are a continual and costly problem for banks, and one which they always try to combat. One fraudulent banking transaction involves a scheme whereby counterfeit checks, written on the same account, are cashed at several branches of the same bank, or at different banks, at substantially the same time. The account on which each check is written has sufficient funds to cover only one of these checks.

Each of the counterfeit checks is cashed by the respective branch at which it is presented, because the computer at each respective branch indicates sufficient funds in the account for the particular check being cashed. Once all of the checks have cleared a few days later, the bank has losses for the total of all but one of the checks. For large banks, this type of fraud may amount to losses in the range of several millions of dollars per year, or perhaps more.

One conventional system, described in U.S. Pat. No. 4,747,050, issued to Bruno Brachtl et al., discloses the use of intelligent secure bank cards, which store a personal key and an account number for each user, and in which the user enters a personal identification number (PIN) that is not stored in the secure bank card, to enable an electronic funds transfer. However, such a system requires that the users remember their PINs, as well as requiring the users to have their secure bank card with them whenever a bank transfer is required. It would not prevent payees from cashing checks drawn on the payor's account.

Another conventional system, described in U.S. Pat. No. 4,109,238, issued to Robert Creekmore, involves the use of a positive check verification system. The check verification system includes a remote-located transaction processor, which communicates with a number of local point-of-use terminals. The transaction processor includes a file of customers who are entitled to verify checks. Each check verifier has an identification card containing a unique number for each customer, and a personal customer code, which is not on the card, is also provided for manual entry into an input terminal by the customer. Check verification is then established, without the need to know the account balance of a particular account being drawn against. However, such a system has a drawback in that the check verifier must respond to a check request before the check can be verified at a point-of-use terminal, as well as requiring the customers to have the identification card with them when a bank transfer is being made. Also, such a system may not effectively counteract the fraudulent check cashing scheme described above.

SUMMARY OF THE INVENTION

The present invention is directed to a method of verifying a check presented to one of a plurality of banks. The method includes a step of recording, on the check, information regarding an account against which the check is to be drawn, a bank having the account which is to be drawn against, and a central processing center. The method also includes a step of storing, at the central processing center, current account information with respect to all accounts of the plurality of banks. The method further includes a step of sending to the central processing center, through a communication channel connecting the one bank and the central processing center, the information regarding the one check presented at the one bank. The method still further includes a step of determining, at the central processing center, whether or not there are sufficient funds to cover the one check in the account against which the check is to be drawn. The method also includes either a step of provisionally debiting the account, and notifying the one bank that the check can be drawn against the account, once it is determined that sufficient funds are present in the account to cover the one check. The method further includes a step of notifying the one bank that the check cannot be drawn against the account if it is determined that insufficient funds are present in the account to cover the check.

The present invention is also directed to an apparatus for determining whether a check can be drawn against a particular account against which the check is presented. The apparatus includes a central processing center having a memory for storing information related to accounts of a plurality of banks that are communicatively coupled to the central processing center. The apparatus also includes a plurality of communication channels respectively connecting the plurality of banks with the central processing center. The apparatus further includes reading units in each of the plurality of banks, the reading units configured to read the check presented at one of the plurality of banks and to send information stored on the one check to the central processing center. The central processing center further includes a processor to determine, based on the stored information in the memory and the received information from the reading units, whether sufficient funds are present in the particular account to cover the one check. The processor is configured to send a pay authorization or a refusal to the one bank at which the one check was presented, depending on whether or not sufficient funds are present in the account to cover the check.

In an alternative embodiment, the central processing center sends an inquiry to a respective bank that has the particular account, and receives information from the respective bank as to whether or not sufficient funds are present in the account to cover the checks In this alternative embodiment, much less information is needed to be stored at the central processing center with respect to the other embodiment.

BRIEF DESCRIPTION OF THE DRAWINGS

The above-mentioned objects and advantages of the invention will become more fully apparent from the following detailed description when read in conjunction with the accompanying drawings, with like reference numerals indicating corresponding parts throughout, and wherein.

DETAILED DESCRIPTION OF THE PREFERRED EMBODIMENTS

Figure 1:
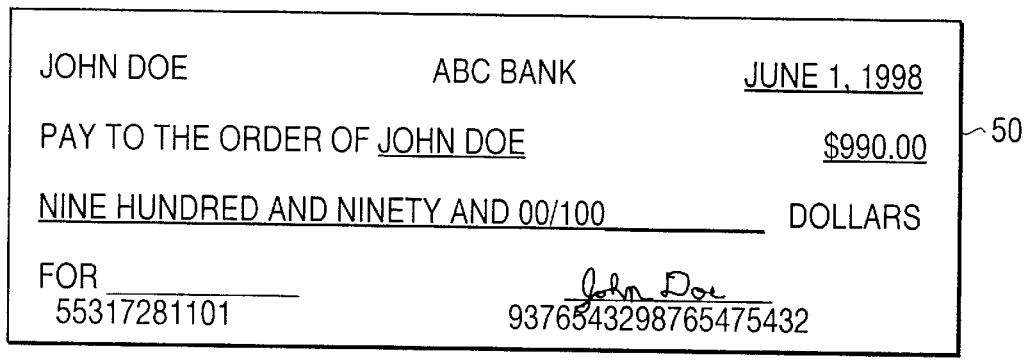
FIG. 1 shows one example of a location of information on a check that is used by a processing center, according to the present invention.

Preferred embodiments of the invention will be explained in detail below with reference to FIGS. 1–3. The present invention is directed to a system and a method for lessening the possibility of fraudulent banking transactions, by the use of a national, regional, or international processing center that is accessible by computer to all banking establishments in the system.

In the present invention, a processing center will be assigned a unique numeric code of a plurality of digits. The number of digits for the unique code will be determined based on the number of processing centers in the system, as well as the security code utilized for the information transfer between banks and the processing center. In a first embodiment, which will be described in detail hereinbelow, only one processing center exists in the system. However, other processing centers may co-exist, such that these processing centers have the capability to retrieve information from each other in a quick and easy manner, such as via the Internet using encrypted data, or via dedicated lines communicatively connecting these processing centers to each other.

Each banking institution will have its own unique numeric code of a plurality of digits, with the number of digits of the unique code again depending on the total number of different banking institutions in the system, as well as the security code utilized. Also, each customer, or account, will have its own unique digital code of a plurality of digits, with the number of digits of the unique code depending upon the number of accounts in the banking institution that has the largest number of accounts, as well as the particular security code utilized.

For example, the processing center may be assigned a five-digit number, e.g., 75432. The banking institution may be assigned a six-digit number, e.g., 987654 for Nations' Bank, or 987653 for Summit Bank. The customer or account may be assigned an eight-digit number, e.g., 98765432. If a customer has more than one account, each account is preferably assigned a different eight-digit number. However, for banks that allow for money to be drawn against other of the customer's accounts or an overdraft line of credit when a particular account that is being drawn against does not have sufficient funds, all of those accounts may be assigned the same eight-digit number for purposes of check verification by the processing center.

In the system and method according to the invention, all of the above-mentioned information will be provided on a check. For example, a check may have the following digits placed thereon: 98765432 . . . 987654 . . . 75432. The digits may be placed in any suitable location on the check, such as the front-bottom portion of the check or certain areas on the back of the check. The digits may be encoded onto the check in any of a variety of forms, such as, for example, a numeric format, a bar code format a magnetic strip (such as those used with credit cards) with data encoded therein, or any other types of visible or invisible means for encoding or labeling this data on the check. The bar code or magnetic strip format will allow for rapid, automatic processing of checks. Of course, with an optical character recognition device (OCR), the processing of a check with digits for the coded information may be performed as rapidly as a check having bar codes or magnetic strips for the coded information.

The example given above uses numbers or digits for representing the information on the check, but other representations, such as letters or characters, e.g., ABC, #, %, $, or combinations of numbers, letters and characters, may also be utilized in order to uniquely identify a processing center, a banking institution, or an account. For example, 98765# or ABC may represent a particular bank, while 98765@ or KNB may represent another particular bank.

Also, as an optional feature for the present invention, each account will have a personal identification number (PIN) assigned to it, or a NAME code assigned to it, for added security measures.

When a check is introduced for payment to any bank branch or any bank participating in the system, a bank teller enters the information, which is printed on the check, into the computer. This entering of information may be done either manually or automatically with a device that is configured to read the coded information, such as a bar code scanner for reading bar codes, a magnetic strip reader for reading information on magnetic strips, an OCR device, and the like.

Once the information on the check has been read, it is transmitted, via a computer located at the bank where the check is being presented, to a computer at the processing center. The means of transfer may be by any of a number of ways, such as by a modem-to-modem hookup between the bank branch and the processing center over the public switched telephone network, a wide area network connecting the bank branch with the processing center, an Internet connection, or the like. In a first embodiment, the processing center maintains a record of each account at each participating bank, as well as the current balance in that account. The processing center does not maintain any personal identification information, but only stores numbers or characters as an index to a current balance of a particular account. That way, a customer's privacy is maintained in the system and method according to the invention.

In a second embodiment, the processing center stores a record of each account of each participatory bank, but does not store a current balance of each account. Instead, in the second embodiment, the processing center sends a current balance request to the bank from which the check is to be drawn against. Upon reception of information from that bank to the processing center concerning the current amount of funds available in the account from which the check is to be drawn against, the processing center notifies the bank branch at which the check is being presented as to whether or not that check can be cashed. In the second embodiment, the processing center provides a data relay function between different banks and bank branches of the same branch, in a fast and effective manner. Also, in the second embodiment, the memory storage at the processing center is less than in the first embodiment, since account balances for all bank accounts using the system and method according to the invention are not stored at the processing center.

In the first embodiment, once a computer at the processing center reads the received information sent from a first bank at which a check has been presented for cashing, the processing center determines whether there are sufficient funds in the account to be drawn against, and if so, the account is provisionally debited at the processing center until such time as the actual check clears the system through the Automated Clearing House (ACH) currently used by all banks. In the second embodiment, once the processing center has read the received information sent from the first bank, and then has sent an inquiry to a second bank having the account that is to be drawn against, and has received current account balance information from the second bank as a result of the inquiry, the processing center determines whether there are sufficient funds in the account to be drawn against. If there are sufficient funds in the account, processing center notifies the second bank to provisionally debit the relevant account, even though the check has not cleared through the ACH. At the time of clearance through the ACH, in both the first and second embodiments, the provisional debit becomes a true debit on the account. However, for purposes of the processing center in the first embodiment and the participatory banks in the second embodiment, a provisional debit is treated the same as an actual debit on an account. Such clearance can be either at the processing center or at a bank's own transaction center, so long as the processing center eventually gets the account balance from its participatory banks.

In this manner, any branch of one bank or any other bank can make an instant assessment as to the availability of funds to cover a check that is presented at that bank. For example, assume an account #101 at Bank #5 has a balance of $1000. When customer A arrives at Bank #6 at 10:00 a.m. on May 15, 1998 with a check for $990 to be drawn against account #110 at Bank #5, that check will have information related to the account number (101), the bank number which maintains the account against which the check is to be drawn (5), and the processing center that is to receive that information. Such a check 50 is shown in FIG. 1, with the pertinent information being read off the bottom-right-hand portion of the check 50. In FIG. 1, the beginning digits 98765432 correspond to the pertinent account number (101), the middle digits 987654 correspond to Bank #5, and the ending digits 75432 correspond to the processing center. A teller at Bank #6 enters the pertinent data (either manually or automatically) read from the check 50, and those data are sent immediately to the processing center. The digits (55317281101) shown on the bottom-left portion of the check 50 correspond to the information that is currently used by all banks to route checks through the banking system.

In the first embodiment, the processing center checks its stored to determine whether or not account #110 of Bank #5 has sufficient funds to cover this check, and provisionally debits account #110 in the amount of $990, leaving a provisional available balance of $10 (i.e., $1000−$990= $10). The processing center also sends back information to Bank #6, informing it that the check can be drawn against the relevant account. The total time for accomplishing this transaction is typically very short, and may only take a minute or so to complete. In the second embodiment, the processing center inquires at Bank #5 (that is, the bank issuing the check) as to the current balance in account #110. Based on the information sent to the processing center from Bank #5, the processing center informs Bank #6 as to whether or not the check can be cashed. If the check can be cashed, processing center notifies Bank #5 so that it can provisionally debit account #110. In the second embodiment, there is no checking of stored account balance information at the processing center, as is done in the other embodiment. Rather, the processing center sends requests to relevant banks in order to determine current balances on accounts to be drawn against Now assume another customer, customer B, arrives at Bank #12 at 10:05 am. on May 15, 1998 to try to cash a counterfeit check for $990 against account #110 of Bank #5. When a teller at Bank #12 either manually or automatically enters the data on the check, that information is sent immediately to the processing center.

In the first embodiment, the processing center checks its stored information to determine that account #110 of Bank #5 does not have sufficient funds to cover this check, since account #110 of Bank #5 now has a provisional available balance of $10. The processing center sends back information to Bank #6, informing it that the check for $990 cannot be drawn against the relevant account. Other persons trying to draw against account #110 of Bank #5 will meet with the same fate.

In the second embodiment, the processing center inquires at Bank #5 as to the current balance in account #110. Based on the information sent to the processing center from Bank #5, in which Bank #5 informs the processing center that account #110 has been provisionally debited to $10, the processing center informs Bank #6 that the check for $990 cannot be drawn against the relevant account.

The ability to centrally debit an account from any particular bank based on a first presentation for cashing a check against that account, with the debiting being performed by a processing center that is accessible to all of the banks via secure communication lines, allows for these banks to thwart certain types of fraudulent check cashing schemes.

Figure 2:
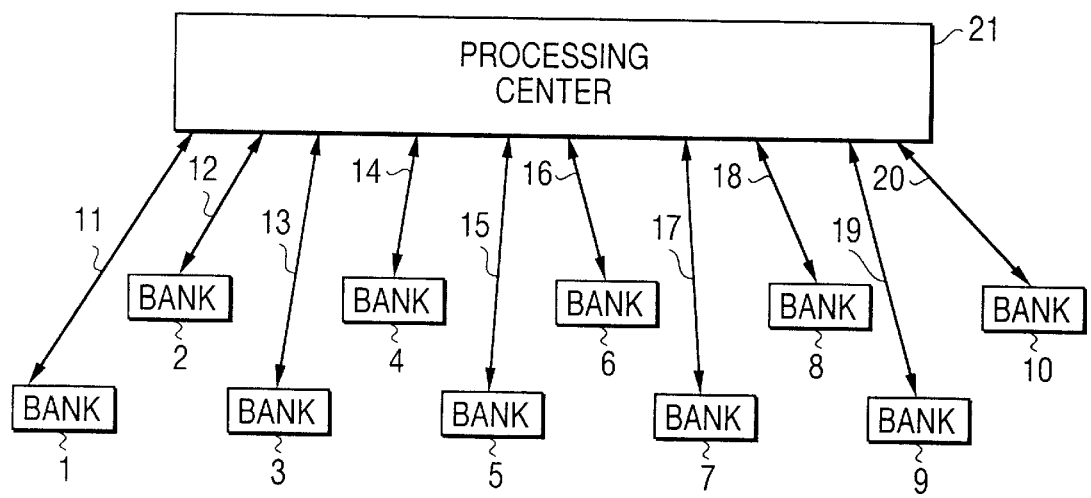
FIG. 2 shows a block diagram of a secure check processing system according to the present invention.

FIG. 2 shows a structure of the system according to the invention. In FIG. 2, Banks 1–10 are connected to Processing Center 21 via secure communication lines 1–20, respectively. The means of security can be by a variety of conventional methods, such as using a private key/public key system, or the like. Once a check is presented at any one bank, say bank 1, for example, the processing center/ banking institution/account number information stored on the check is read at bank 1, and is sent via the respective secure communication line 11 to the processing center 21.

Figure 3:
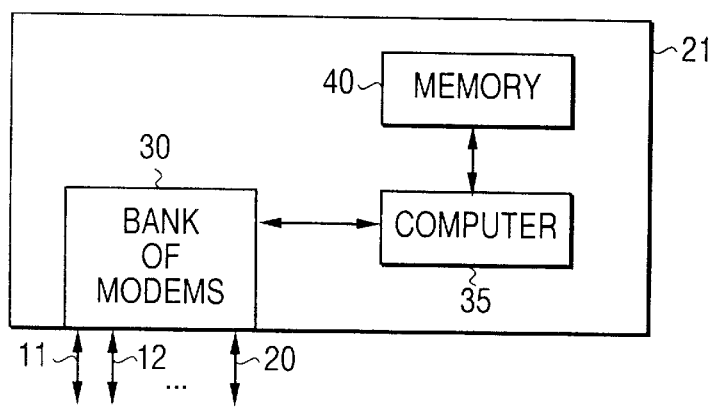
FIG. 3 shows a block diagram of a central processing center according to one embodiment of the present invention.

Referring now to FIG. 2 and FIG. 3, the processing center 21 has a bank of modems 30 to communicate with the banks 1–10 over the secure communication lines 11–20. The processing center 21 also has a memory 40. In the first embodiment, memory 40 stores information as to current account balances for accounts at each of the banks 1–10. Based on that stored information as well as the received information over the secure communication line 11, a computer 35 at the processing center 21 determines whether the account that a check is drawn against has sufficient funds at the present time. That determination is sent to the pertinent bank over the corresponding secure communication line (e.g., secure communication line 11 for bank 1), and the bank acts appropriately. In the second embodiment, memory 40 does not store information as to all current account balances, but only stores information as to account balances for accounts to be drawn against due to submission of checks against those accounts. In the second embodiment, the processing center 21 requests information as to those relevant accounts to be drawn against from the pertinent banks via lines 11–20, and stores the received information in the memory 40.

In the present invention, the processing center 21 has stored in the memory 40 information corresponding to account numbers and banking institutions. There is not stored any personal information in the memory 40, such as the name of a particular person who owns a particular bank account. That way, anonymity is maintained for all bank customers using the present invention.

In the first embodiment, the banks 1–10 transmit information related to changes in their respective accounts to the processing center via communication lines 11–20 as soon as these changes take place. For example, if an account has a direct deposit made to it, that information is relayed to the processing center 21 immediately by the bank receiving the transfer of funds. Thus, the processing center 21 always has stored therein a current status of all accounts in the participating banks 1–10. In the second embodiment, this updating of information in the memory 40 is not required, since the processing center 21 will send a request to the pertinent bank for an account balance at the time a request from another bank (at which a check has been presented for cashing) has been made.

If an account holder or a bank branch needs to communicate with the processing center to fix a problem, such as when a customer claims an error in that the account surely must have enough funds to cover a particular check, then, in the present invention, the customer must provide his or her special PIN number or NAME code (e.g., mother's maiden name) for identification.

Optionally, the customer may also hold a valid identification card bearing his or her picture and/or fingerprint, which can be used to authenticate the customer. The fingerprint could also be scanned by a fingerprint identification machine at the bank, if one is available, in order to determine the true identification of the customer desiring to cash a checks Although identification cards and fingerprint records can be counterfeited or stolen, in the present invention, the bank's exposure is limited to the balance in the account, and no more. Also, a computer at the processing center can be used to monitor the number of checks, frequency of check cashing, and location of presentation, with certain patterns setting off a signal requiring confirmation of the individual presenting the check.

Thus, for example, if the previous one hundred checks (checks 1–100) drawn off a particular account were presented at banks in New Jersey, and if the next check (check 101) is presented to a bank in Las Vegas, then the information concerning the next check as well as where it is presented, will be sent to the processing center. The processing center may then determine that a precise identification of the drawee is required, even though the account has sufficient funds for the check being presented to a bank in Las Vegas. This precise identification may be made by the above-mentioned fingerprint record or identification card that now has be presented by the drawee to a teller in the bank in Las Vegas.

Thus, the processing center may have computers programmed to require additional information from drawees for a variety of reasons, even when the check being presented for cashing can be accommodated by the account from which it is drawn against. Thus, in the example given above, even if the account has sufficient funds, the drawee in Las Vegas may still be required to show more detailed proof of his or her identity, due to the unusual transaction (based on prior history) of a withdrawal being made outside of New Jersey.

The present invention allows for a bank check security system that codes all checks for verification, where the coded information from these checks are presented to a regional, national, or international bank processing center. By utilizing only the unique digits/characters for individual banks and individual accounts to be mapped against data corresponding to current account balances, the processing center does not know or require personal information as to persons or corporations who own particular accounts.

In the alternative configurations having regional or national processing centers that may operate with an international processing center, all transactions within the region or within the nation can be checked to ensure the integrity of checks presented within the particular region or the particular nation, but any transactions outside of that region or nation would not be known to the regional or national processing center. In those instances, the bank outside the particular region must use other means to ensure that the check being presented is a valid one, and that the account that is being drawn against has sufficient funds. This may amount to that bank holding the check and not cashing it until such verification (such as by a telephone call from one bank to another bank) is made, if there is no processing center for that particular region in which the check is being presented.

While preferred embodiments have been described herein, modification of the described embodiments may become apparent to those of ordinary skill in the art, following the teachings of the invention, without departing from the scope of the invention as set forth in the appended claims.

What is claimed is:

1. A method of verifying a check presented to one of a plurality of banks, the method comprising the steps of:
   a) recording, on the check, information regarding an account to which the check is to be drawn against, a bank having the account which is to be drawn against, and a central processing center;
   b) retrieving, by the central processing center, current account information with respect to all accounts of the plurality of banks;
   c) sending to the central processing center, through a communication channel connecting the one bank and the central processing center, the information regarding the check presented at the one bank; and
   d) determining, at the central processing center, whether or not the check is capable of being drawn against the account to which the check is to be drawn against;
   e) if the check is capable of being drawn against the account, provisionally debiting the account and notifying the one bank that the check can be drawn against the account; and
   f) if the check is not capable of being drawn against the account, notifying the one bank that the check cannot be drawn against the account.

2. The method according to claim 1, wherein the step e) is performed before the check clears, and
   wherein when another check is presented against the account prior to the check clearing, the central processing center uses a current balance of the account based on the provisional debiting of the account to determine if the another check can be drawn against the account.

3. The method according to claim 1, wherein each of the plurality of banks are connected to the central processing center through a corresponding secure communication channel.

4. The method according to claim 1, wherein the information recorded in the step a) includes a first plurality of digits or characters representing the central processing center, a second plurality of digits or characters representing the bank having the account which is to be drawn against, and a third plurality of digits or characters representing the account.

5. The method according to claim 4, wherein the information is stored on the check as one of a bar code, a magnetic strip, and a string of digits and/or characters, and an invisible imprint on the check.

6. A method of verifying a check presented to one of a plurality of banks, the method comprising the steps of:
   a) recording, on the check, information regarding an account to which the check is to be drawn against, a bank having the account which is to be drawn against, and a central processing center;
   b) sending to the central processing center, through a communication channel connecting the one bank and the central processing center, the information regarding the check presented at the one bank;

c) sending a request, by the central processing center to the bank having the account which is to be drawn against, regarding current account information of the account which is to be drawn against;

d) receiving, by the central processing center, the current account information sent from the bank having the account which is to be drawn against;

e) determining, at the central processing center, whether or not the check is capable of being drawn against the account to which the check is to be drawn against;

f) if the check is capable of being drawn against the account, provisionally debiting the account and notifying the one bank that the check can be drawn against the account; and g) if the check is not capable of being drawn against the account, notifying the one bank that the check cannot be drawn against the account.

7. An apparatus or facility for determining whether a check can be drawn against a particular account for which the check is presented against, the apparatus comprising:

a central processing center having a memory for storing information related to accounts of a plurality of banks that are communicatively coupled to the central processing center;

a plurality of communication channels respectively connecting the plurality of banks with the central processing center; and reading units in each of the plurality of banks, the reading units configured to read the check presented at one of the plurality of banks and to send information stored on the check to the central processing center, wherein the central processing center determines, based on the stored information in the memory and the received information from the reading units, whether the check can be drawn against the particular account, and wherein the central processing center sends information related to the determination by the central processing unit to the one bank at which the check was presented.

8. The apparatus or facility according to claim 7, wherein, when the determination is that the check can be drawn against the particular account, the particular account is provisionally debited by the central processing center and the memory is updated to reflect the provisional debiting.

9. The apparatus or facility according to claim 8, wherein the memory is updated before the check clears the bank clearing house system, and wherein when another check is presented against the particular account prior to the check clearing, the central processing center uses a current balance of the particular account based on the provisional debiting of the particular account to determine if the another check can be drawn against the particular account.

10. The apparatus or facility according to claim 7, wherein each of the plurality of communication channels is a secure communication channel.

11. The apparatus or facility according to claim 7, further comprising a recording unit for recording the information onto the check, the information including, a first plurality of digits or characters representing the central processing center, a second plurality of digits or characters representing the bank having the account which is to be drawn against, and a third plurality of digits or characters representing the particular account.

12. The apparatus or facility according to claim 11, wherein the information is stored on the check as one of a bar code, a magnetic strip, and a string of digits and/or characters, and an invisible imprint on the check.

* * * * *